(12) United States Patent
Sprecher

(10) Patent No.: US 7,873,430 B1
(45) Date of Patent: Jan. 18, 2011

(54) SYSTEM THAT CAN SCHEDULE OPERATIONS THAT ARE PERFORMED ON INDUSTRIAL CONTROL DEVICES

(75) Inventor: Reginald W. Sprecher, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 389 days.

(21) Appl. No.: 11/424,099

(22) Filed: Jun. 14, 2006

(51) Int. Cl.
*G06F 19/00* (2006.01)

(52) U.S. Cl. .................. 700/100; 700/96; 700/102; 705/8

(58) Field of Classification Search ........... 700/99–102; 705/8

See application file for complete search history.

(56) References Cited

U.S. PATENT DOCUMENTS

| | | | |
|---|---|---|---|
| 4,123,794 A | 10/1978 | Matsumoto | |
| 4,389,706 A | 6/1983 | Gomola et al. | |
| 4,549,276 A | 10/1985 | Inaba et al. | |
| 4,994,980 A | 2/1991 | Lee et al. | |
| 5,406,476 A | 4/1995 | Deziel, Jr. et al. | |
| 5,530,643 A | 6/1996 | Hodorowski | |
| 5,574,640 A | 11/1996 | Sycara et al. | |
| 5,968,166 A | 10/1999 | Kakiage et al. | |
| 6,088,626 A * | 7/2000 | Lilly et al. | 700/100 |
| 6,091,998 A | 7/2000 | Vasko et al. | |
| 6,105,520 A * | 8/2000 | Frazer et al. | 112/117 |
| 6,356,797 B1 | 3/2002 | Hsieh et al. | |
| 7,296,267 B2 * | 11/2007 | Cota-Robles et al. | 718/1 |
| 2006/0070078 A1 * | 3/2006 | Dweck et al. | 718/104 |
| 2006/0080389 A1 * | 4/2006 | Powers et al. | 709/203 |
| 2006/0117011 A1 * | 6/2006 | Arbel | 707/9 |

* cited by examiner

*Primary Examiner*—Paul L Rodriguez
*Assistant Examiner*—Sheela Rao
(74) *Attorney, Agent, or Firm*—Turoey & Watson LLP; William R. Walbrun; John M. Miller

(57) ABSTRACT

The claimed subject matter provides a system and/or method that facilitates automatically scheduling an operation in an industrial environment. An interface component can facilitate receipt of a list/schedule including at least one operation related to a device within the industrial environment. A scheduler component can automatically perform the at least one operation on the device at a time indicated by the list/schedule utilizing at least one agent hosted by an agent component, wherein communication is employed with a bridge component. The bridge component can provide communication as if in the same program space between at least two of the scheduler component, the agent, the agent component, an agent component manager, and/or any suitable component that requires data transfer.

26 Claims, 12 Drawing Sheets

SYSTEM THAT CAN SCHEDULE OPERATIONS THAT ARE PERFORMED ON INDUSTRIAL CONTROL DEVICES

TECHNICAL FIELD

The claimed subject matter relates generally to scheduling operations in a facility and, more particularly, to automatically performing scheduled operations on a device within an industrial environment.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

In general, an industrial automation environment can include a plurality of devices, controllers, and the like. Moreover, various makes, models, types, and/or applications can be associated with respective devices, controllers, and the like, which can complicate the employment of control systems and/or components based at least in part upon the vast and disparate characteristics associated therewith. In order to enhance utilizing devices, controllers, and the like within an industrial automation environment, various maintenance and/or operations can be implemented. However, with the multitude of devices, controllers, and the like, implementing such maintenance and/or operations can be a costly, redundant, and meticulous task.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate automatically performing an operation on a device within an industrial automation environment. A scheduler component can receive data (e.g., a list—also herein referred to as a schedule, a schedule, an operation, a time to perform an operation, a list of devices and respective operations to perform, security and/or authorization data related to the operations to execute, a particular component to execute the operation, a particular device to perform an operation, etc.) via an interface and automatically perform an operation on a device associated with an industrial automation environment based at least in part upon the received data. The scheduler component can automatically execute at least one operation for at least one device at a particular time and/or time interval, wherein the operation and/or the particular time and/or time interval can be defined by the received data (e.g., list, schedule, information related to the schedule, when to perform the operation, the operation to perform, the device to act upon, etc.). Moreover, the scheduler component can schedule operations on various devices to share the load of such operations over a plurality of components (e.g., hardware, software, combination of hardware and software, a computer, etc.).

In one aspect in accordance with the claimed subject matter, the scheduler component can automatically initiate operations such as, but not limited to, a back-up of data, a re-boot, a shut-down, a virus-scan, a data-scan, a verification of data, a data upload, a system-check, a test, an update, a clean-up, a maintenance (e.g., physical and/or software-based), etc. Furthermore, the device can be any suitable device associated with an industrial automation environment such as, but not limited to, a physical device, a software device, an application, a virtual device, a programmable logic controller (PLC), a controller device, a pump, a press, a valve, a drain, a heater, a cooler, a switch, a sensor, a conveyor, and/or a portion thereof, as well as software, firmware, etc.

In accordance with an aspect of the claimed subject matter, the scheduler component can further utilize a bridge component. The bridge component can be an object that allows agents (e.g., unit of functionality, a portion of code, etc.) that reside on disparate machines (e.g., agent instant) to communicate to the scheduler component as if that agent(s) were on the same machine/component and/or in the same application space as the scheduler component. In other words, the bridge component allows a plurality of computers to act and operate code (e.g., agents) in order to perform the particular operation based on the received schedule. Specifically, the bridge component provides communication techniques for any suitable data (e.g., incoming and outgoing) related to the scheduler component. Moreover, the scheduler component can employ a distribute component that facilitates dividing at least one operation to one or more agent components/computers. In addition, the scheduler component can utilize an agent component manager that ascertains whether the received data (e.g., operation, agent, etc.) requires a specific component and/or machine to perform the operation(s) and can utilize the specific component and/or machine upon availability.

In accordance with another aspect of the innovation described herein, the scheduler component can utilize a detection component that can detect any alterations associated with devices and/or schedules within the industrial environment. In particular, the detection component can be communicatively coupled to the industrial environment and poll the devices to ascertain if any schedules exist, have been added, removed, changed, and/or any combination thereof. In other aspects of the claimed subject matter, methods are provided that facilitates automatically performing an operation on a device within an industrial automation environment.

In another aspect in accordance with the subject innovation, the subject innovation can include a data repository that can retain a hierarchical representation of devices and/or at least one schedule related to the device(s). The data repository can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
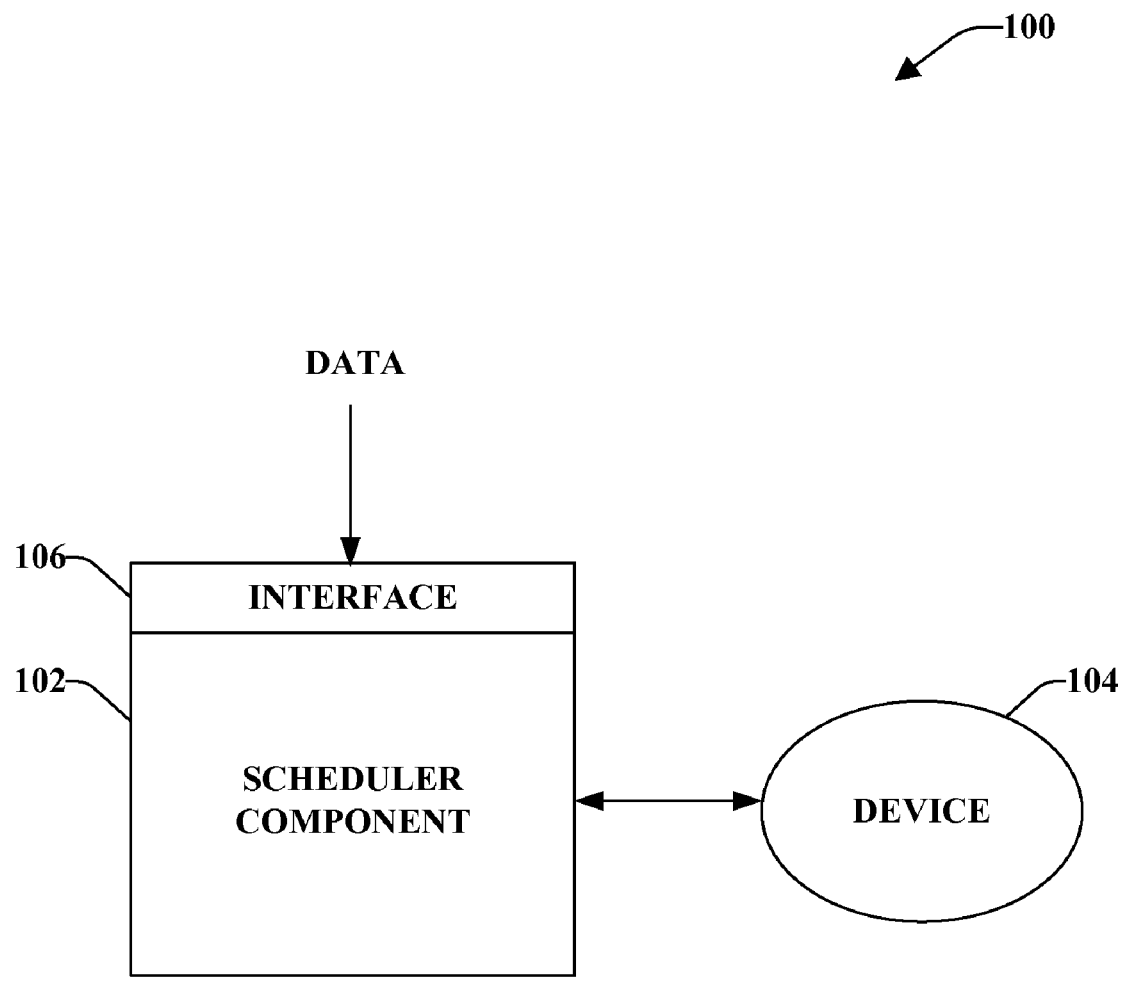
FIG. 1 illustrates a block diagram of an exemplary system that facilitates automatically performing an operation on a device within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates automatically performing an operation on a device within an industrial automation environment. The system 100 can include a scheduler component 102 that can receive data via an interface 106 (discussed infra) and automatically perform a scheduled operation on a device 104. The data can be, but is not limited to, a list (also referred to as a schedule), a schedule, an operation, a time to perform an operation, a list of devices and respective operations to perform, security and/or authorization data related to the operations to execute, a particular component to execute the operation, a particular device to perform an operation, etc. For instance, the system 100 can schedule operations that are implemented on an industrial control device, wherein the operations are defined in a list (e.g., a schedule) which includes operation(s) to perform along with when to perform the specified operation. Conventionally, such operations where manually performed and/or initiated; yet, utilizing the scheduler component 102, the operations can be performed quickly and distributed among various components, machines, software, and the like. It is to be appreciated that the smallest unit of operation that can reasonably be handled is the agent, wherein the agent performs a given operation. For instance, a backup is handled by a single agent and the single agent is responsible for performing the entire backup. However, it is to be appreciated that in some instances, the scheduler component 102 can divide an operation (e.g., such as a backup) amongst more than one agents, wherein the more than one agent may perform a portion of the operation.

In one example, the scheduler component 102 can receive a list of operations that are to be performed at particular times on specific devices such as the device 104. The scheduler component 102 can automatically initiate at least one of the operations at the designated times on the designated device utilizing a bridge component (not shown) for communication to an agent. Thus, three schedules can include an operation 1 for device A at time w, an operation 2 for devices B and C at time x, and an operation 3 for devices D and E at times y and z respectively, wherein the scheduler component 102 can receive such data and ascertain what operations are to be performed on which devices and at which time. Moreover, the scheduler component 102 can divide its tasks and/or operations to at least one of available components/computers, designated components/computers, multiple components/computers, components/computers satisfying minimum requirements, a particular agent computer, etc.

As described above, the scheduler component 102 can be software, hardware, and/or any combination thereof that automatically initiates an operation for the device 104 based at least in part upon the received data. In one example, the scheduler component 102 can receive data and automatically perform various operations by assigning and/or scheduling such operations accordingly. Thus, in one general example, the scheduler component 102 can solely utilize a bridge component (not shown and discussed infra) to communicate to an agent (e.g., unit of functionality, code, etc.) within an agent component/computer and automatically perform the operation. In addition, it is to be appreciated that the scheduler component 102 can utilize the bridge component to communicate with a plurality of agents within respective and numerous agent components/computers as if the agents were in the same application/machine space. In still another example, the scheduler component 102 can be, for example, a computer with at least one instance of an agent (e.g., software, application, software code, process, etc.), wherein the computer can be a host to the at least one agent. In this particular example, the host (e.g., the scheduler component 102) can include a plurality of agents such that each agent can relate to a particular operation that is to be automatically executed on the device 104 and/or any suitable device associated with the industrial environment. It is to be appreciated that if the server component (which is hosting the scheduler component 102) is running the agent, the scheduler component 102 can still utilize the bridge component to communicate to the local agent. In still another example, the scheduler component 102 can utilize the bridge component to communicate to an agent, wherein the agent is hosted by a disparate machine in comparison to the scheduler (e.g., the scheduler component 102 does not host an agent). Moreover, there can be a plurality of hosts having agents that can individually, collectively, and/or any combination thereof automatically execute the specified operations to at least one device 104.

In accordance with one aspect of the subject innovation, the scheduler component 102 can identify a unique machine and/or component to execute a given task and/or portion of an operation. For instance, the scheduler component 102 can automatically wait until a designated component/machine is available and then execute the operation on the specific machine. In another instance, an agent can have a set of defined minimum requirements and it can be the agent that provides the behavior that is desired. Thus, the agent can ascertain the hardware/software minimum requirements, wherein the scheduler component 102 may only know that an agent is needed to perform a given operation (e.g., the scheduler component 102 communicates to the agent and not to the specific machine such that the connection to a physical computer can be hidden since the scheduler component 102 communicates to agents utilizing the bridge component). In other words, the bridge component allows blind communication for the scheduler component 102 such that the scheduler need not have any knowledge related to how and/or where to connect to a given agent component, agent computer, machine, and the like. For instance, agents on a specific agent component/computer may have data associated with operations which are to be performed, wherein such data can be communicated to the scheduler component 102 via the bridge component. In another aspect in accordance with the claimed subject matter, the components/machines that employ and/or execute the operations on the device 104 can include minimum requirements respective to such operations to be performed. Moreover, the system 100 can provide the ability to run any number of agents on the same agent host/computer/component. Each agent can provide information about itself when it is installed into the industrial environment. For instance, the information can include what agents can co-exist and how many instances of the given agent can run concurrently. This information is used to ensure the agent components/computers are utilized efficiently as possible without impacting the performance of any operation(s). Additionally, this mechanism also provides for extensibility of the operations that can be scheduled. Thus, new and modified behavior can be easily added to the system 100 using such mechanism, wherein each agent package can include one or more runtime components that are executed by the scheduler component 102 and one or more user interface components that are presented to the user (e.g., allowing configuration of the scheduled agent operation).

It is to be appreciated that the operation(s) to be automatically performed by the scheduler component 102 can be any suitable operation related to a device within the industrial automation environment. For instance, the operation can be, but is not limited to being, a back-up of data, a re-boot, a shut-down, a virus-scan, a data-scan, a verification of data, a data upload, a system-check, a test, an update, a clean-up, a maintenance (e.g., physical and/or software-based), etc. Furthermore, the device 104 can be any suitable device associated with an industrial automation environment such as, but not limited to, a physical device, a software device, an application, a virtual device, a programmable logic controller (PLC), a controller device, a pump, a press, a valve, a drain, a heater, a cooler, a switch, a sensor, a conveyor, and/or a portion thereof, as well as software, firmware, etc.

In addition, the system 100 can include any suitable and/or necessary interface component 106 (herein referred to as "interface 106"), which provides various adapters, connectors, channels, communication paths, etc. to integrate the scheduler component 102 into virtually any operating and/or database system(s). The interface 106 can receive data, wherein the data received can relate to a list, a schedule, an operation, a time to employ an operation, etc. In addition, the interface component 106 can provide various adapters, connectors, channels, communication paths, etc., that provide for interaction with the scheduler component 102.

Figure 2:
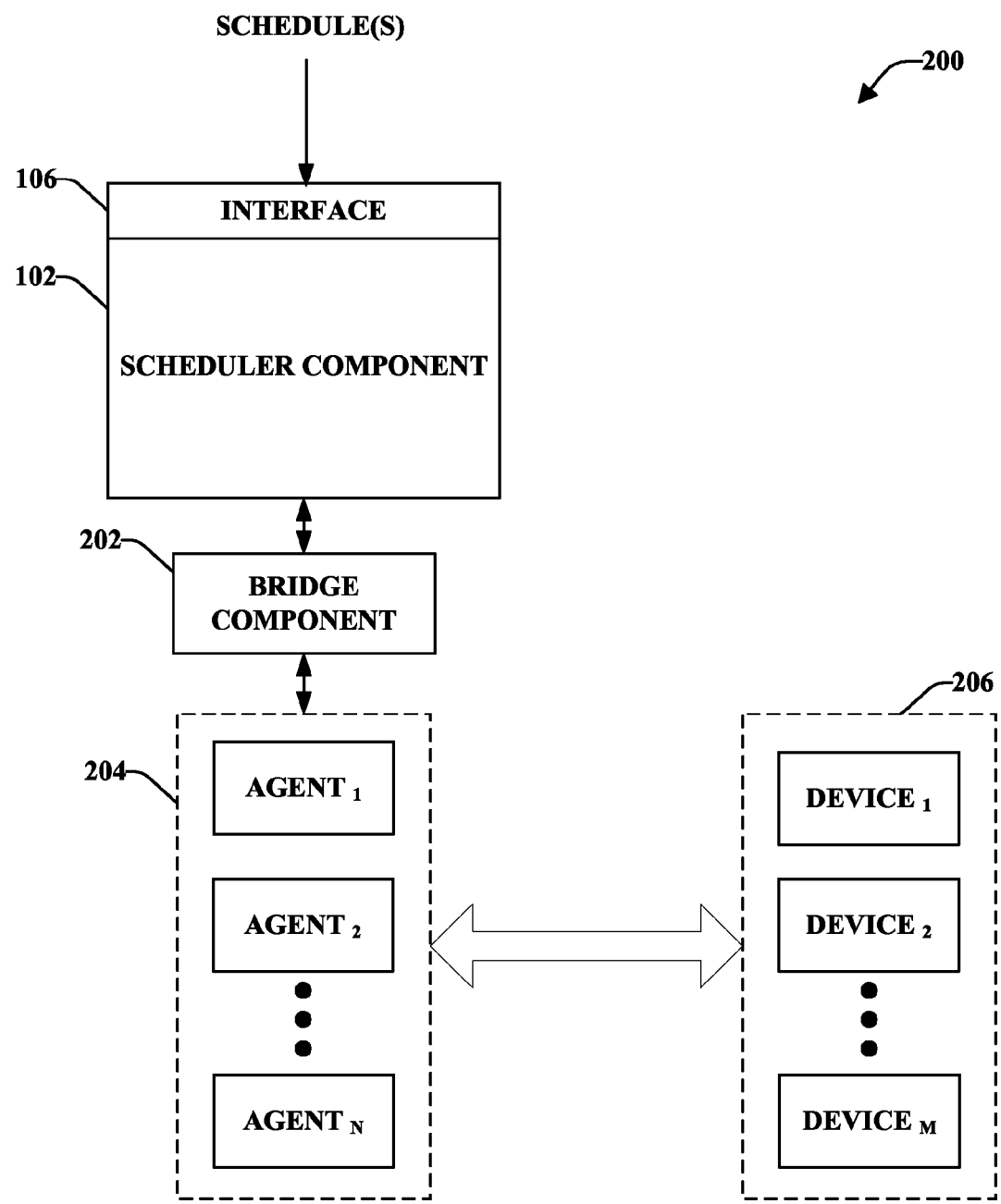
FIG. 2 illustrates a block diagram of an exemplary system that facilitates scheduling one or more operations to be executed on one or more devices associated with an industrial automation environment.

FIG. 2 illustrates a system 200 that facilitates scheduling one or more operations to be executed on one or more devices associated with an industrial automation environment. The system 200 includes the scheduler component 102 that can receive at least one list (also referred to herein as a schedule) via the interface 106, wherein such list and/or schedule can be the basis of automatically employing an operation to one or more devices 204. The schedule and/or list can include data associated with particular operations and/or tasks that are to be executed on devices at particular time intervals and/or specific times. For example, the scheduler component 102 can automatically initiate an operation on the device every 5 hours or on the first day of the month at 12:00 a.m. It is to be appreciated that the scheduler component 102 can perform the operations quickly and efficiently by invoking code (e.g., an agent) on at least one or more components (e.g., computers, agent component, agent computer, hosts, devices, machines, applications, processes, and the like) communicating to such components via a bridge component 202. Thus, the operations to be performed and/or a single operation can be divided among one or more agent components. It is to be appreciated that the addition of an agent component (e.g., a computer and/or machine that hosts an agent) can allow the completion of a scheduled operation in a shorter time. In particular, the bridge component (202) can allow such expandability by allowing particular agent communication to the scheduler component 102 as if within the same application space (e.g., running on the same machine).

The scheduler component 102 can include a plurality of agents 204. The scheduler component 102, in one example, can communicate to a particular agent (e.g., code that performs the operation and/or task) utilizing the bridge component 202, wherein the plurality of agents 204 can be respective to operations that are to be performed on one or more devices 206. There can be any suitable number of agents such as agent 1, agent 2 to agent N, where N is a positive integer. In other words, a schedule can include numerous operations such that the scheduler component 102 can initiate a particular operation utilizing an agent on a specific device. Moreover, the scheduler component 102 can employ the bridge component 202 to communicate to any of the plurality of agents 204, wherein the scheduler component 102 has the ability to handle scheduled operations over the plurality of agents 204 (e.g., available agents) to share the load of operations.

Additionally, the plurality of agents 204 can relate to the one or more devices 206. In one example, the scheduler component 102 can utilize a plurality of agents 204 via the bridge component 202 that relate to respective operations to be performed on one or more devices 206. In another example, the plurality of agents 202 can relate to respective operations that are to be initiated on the one or more devices 204. In still another example, each agent of the plurality of agents 204 can relate to a particular operation to be performed on a designated device out of the one or more devices 206. Thus, the plurality of agents 204 can collectively, individually, and/or a combination thereof facilitate performing an operation(s) on at least one or more devices 206, wherein the scheduler component 102 manages each of the agents, the agent components/computers, and the like. Each agent can provide information about itself when it is installed into the industrial environment. For instance, the information can include what agents can co-exist and how many instances of the given agent can run concurrently. It is also to be appreciated that information can also relate to the runtime code, user interface code, etc. such that it provides an extensible system without making any changes to the scheduler component 102, the system 200, or the corresponding user interface. Although one scheduler component 102 is illustrated, it is to be appreciated that the system 200 can include any suitable number of scheduler components, agent computers/components, agents, hosts, and the like.

Figure 3:
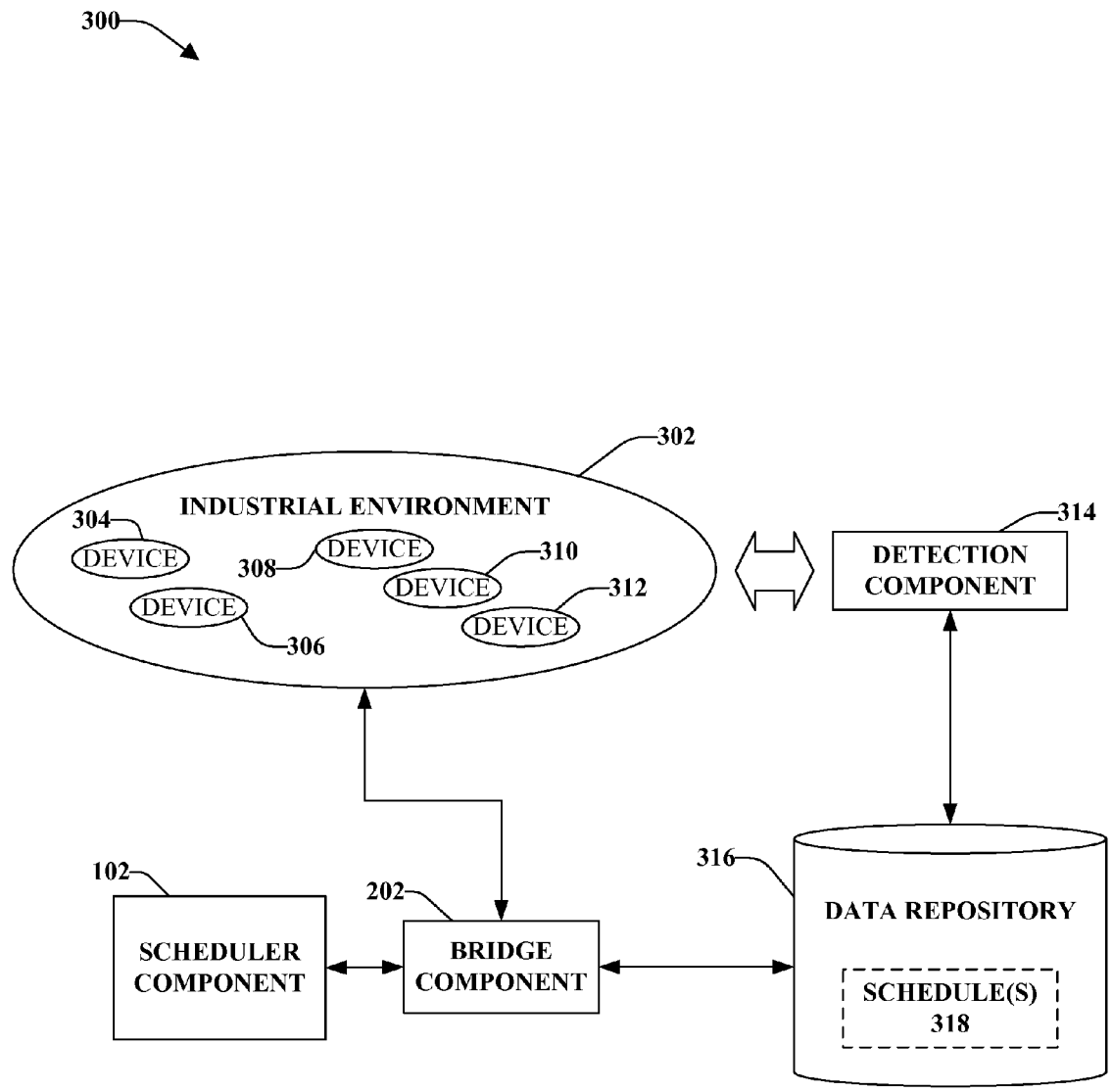
FIG. 3 illustrates a block diagram of an exemplary system that facilitates automatic detection and executing an operation associated with at least one device within an industrial environment.

FIG. 3 illustrates a system 300 that facilitates automatically detecting and executing an operation associated with at least one device within an industrial environment. The system 300 can include a detection component 314 that can be communicatively coupled to the industrial environment 302 and, in turn, the devices 304-312. For example, the devices 304-312 can be communicatively coupled by way of an intranet or other suitable network. The detection component 314 can ascertain when a device has been added to the industrial environment 302, removed from the industrial environment 302, updated within the industrial environment 302, and/or any combination thereof. Any changes associated with the devices 304-312 can be communicated to allow for real-time and up-to-date additions, removals, updates, changes, and the like to ensure quality techniques and/or mechanisms associated with automatically performing operations within the industrial environment 302. Pursuant to an example, the detection component 314 can poll a network and/or server to provide at least one of the following: a master schedule, a schedule, etc.; and a determination whether any alterations have been made with respect to devices 304-312 resident upon the network. In another example, a device may have sufficient intelligence to initiate a message to the detection component 314, wherein such message can include a type or identity of the device, a schedule of the device, an operation to be performed on the device, location upon a network of the device, associated devices, etc. Still further, a device can indicate to the detection component 314 a type of update associated with the device, an operation, a schedule, a list, a time for an operation, and the like.

Once an alteration occurs with respect to one or more devices and/or a respective schedule within the industrial environment 302 and such alteration has been detected by the detection component 314, the alterations can be updated to a data repository 316. For instance, if a device is added to the industrial environment 302, the detection component 314 can ascertain the type of device, location of the device, the operations associated with the device, a list and/or schedule associated with the device, etc. and store such data within the data repository 316. The data repository 316 can be a single data repository and/or can be a distributed data store. It is to be appreciated that the devices 304-312 can include schedules upon introduction to the industrial environment 302, have schedules manually deployed, and/or any combination thereof.

In accordance with one aspect of the subject innovation, the scheduler component 102 can communicative to the data repository 316 via the bridge component 202, wherein the scheduler component 102 can receive an updated schedule and/or at least one schedule 318 stored upon the data repository 316. The scheduler component 102 can dynamically and automatically perform operations on the devices 304-312 within the industrial environment 302 (e.g., communicating via the bridge component 202) based at least in part upon the schedule(s) 318 and/or the detected schedule alterations from the detection component 314. In other words, since the detection component 314 is continuously polling the industrial environment 302 for updated schedules (e.g., which can include changes to devices and/or respective operations), the scheduler component 102 can provide automatic and up-to-date execution of operations on such devices in real-time.

It is to be appreciated that the system 300 can be utilized in a hierarchically structured industrial environment. For example, the devices 304-312 can be hierarchically structured to facilitate management of such devices within the industrial environment 302. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

Figure 4:
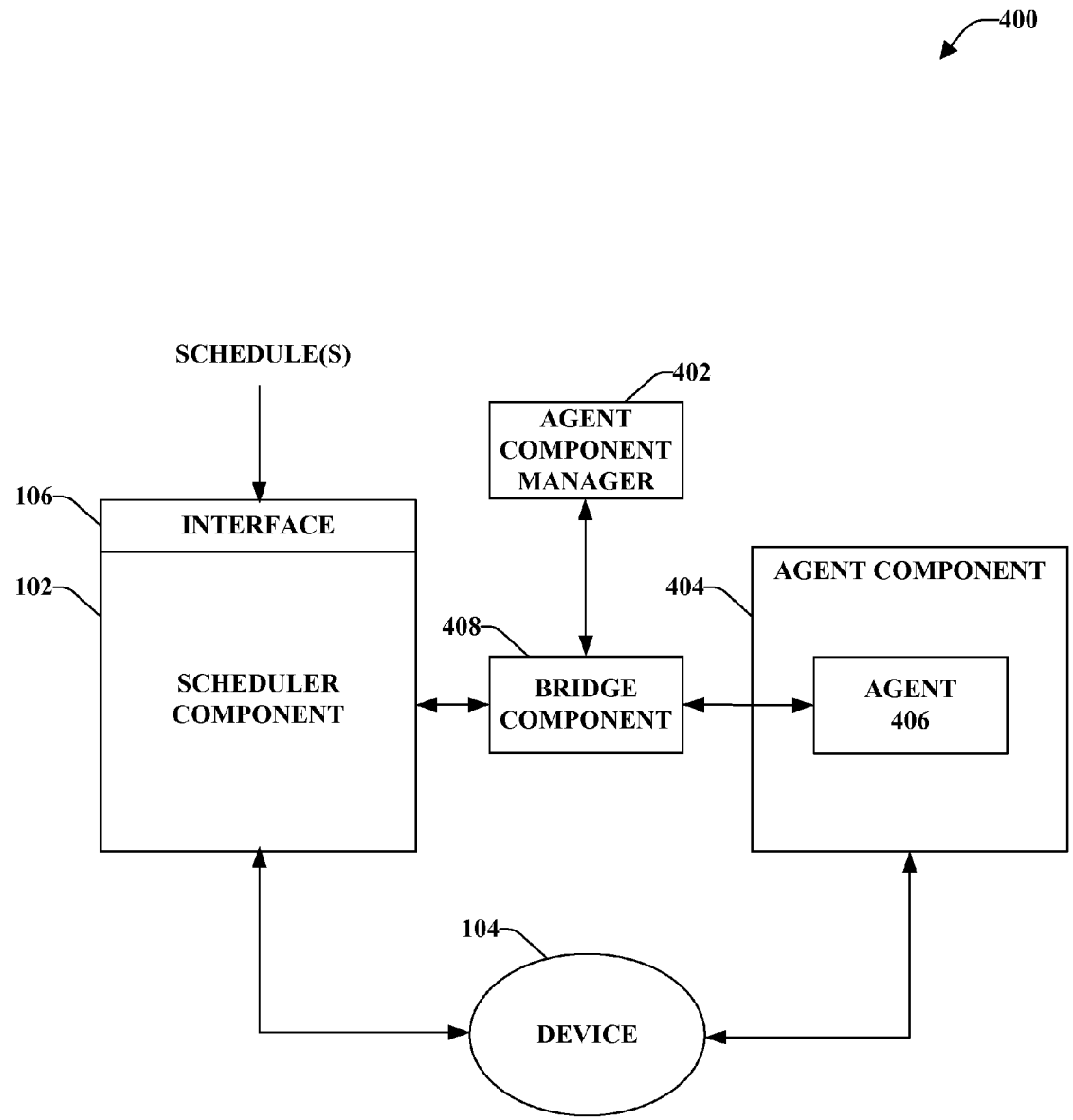
FIG. 4 illustrates a block diagram of an exemplary system that facilitates communication between one or more components that automatically perform operations on devices.

FIG. 4 illustrates a system 400 that facilitates communication between one or more components that automatically perform operations on devices. The system 400 can include scheduler component 102 that can receive a schedule via the interface 106, wherein the schedule can be a list including at least one operation to be performed on the device 104 at a certain instance and/or time. The scheduler component 102 may include an agent 402 that can be a main program, component, code, a unit of functionality, a portion of an application, and the like that can initiate a particular operation. If, for instance, the scheduler component 102 and an agent are resident on the same physical computer (not depicted in FIG. 4), the scheduler component 102 utilizes a bridge component 408 to communicate with such agent. As illustrated in the system 400, the scheduler component 102 does not include an agent and can solely communicate and delegate operations to be performed by particular agents hosted and/or residing on agent computers/components in disparate locations (such as an agent component 404 discussed below). When implementing in such a manner, the scheduler component 102 can communicate to the various portions of code and/or agents within at least one agent component/computer via the bridge component 408 (discussed infra).

The system 400 can include an agent component manager 402 that can manage any suitable number of agent components/computers associated with the system 400. For example, since the scheduler component 102 communicates to agents within the system utilizing the bridge component 408, the scheduler component is unaware of particular locations of machines and/or agent components/computers that host agent(s). Thus, the agent component manager 402 can include data and/or ascertain data related to the agent component/computers and/or machines associated with the system 400. In other words, the agent component manager 402 includes all data and/or knowledge of the machines and/or agent components/computers that host agents. For instance, the scheduler component 102 can include a schedule that requires a particular machine based on minimum requirements, thus, the scheduler component 102 can communicate to the agent component manager 402 via the bridge component 408 to determine which machine and/or agent component is available (and satisfies the requirements) with an agent to perform the operation included within the schedule. Upon availability, the agent component manager 402 can communicate such data back to the scheduler component 102 via the bridge component 408 allowing the operations to be performed accordingly.

In addition, the system 400 can include the agent component 404 that can include an agent 406 that can be associated with the particular operation that is to be executed on the device 104. To communicate to one or more agent components, agent computers, the agent (e.g., a portion of code, a unit of functionality, and the like), a machine, etc., the system can employ the bridge component 408. The bridge component 408 can be an object that allows agents that reside on disparate machines (e.g., agent 406) to communicate to at least one of the following: the main program (e.g., agent 402) as if that agent were on the same machine/component; the scheduler component 102 as if that scheduler component 102 were on the same machine/component; a disparate agent on a disparate machine/component; a disparate agent on the same disparate machine/component; and/or any combination thereof. When a task/operation is to be executed, the request can be made by the scheduler component 102 for an agent (e.g., agent 402) to implement such task. Once the agent is available, the task/operation can be pipelined by the scheduler component 102 to that agent communicating via the bridge component 408. In other words, the bridge component 408 allows blind communication between any portion of code (e.g., an agent) and the scheduler component 102, any agent component, any agent portion of code and a disparate portion of code (e.g., agent to agent communication), and/or any combination thereof regardless of the location (e.g., disparate component(s), disparate machine(s), etc.) of such agents, code, agent components, scheduler component(s), agent computers, etc. Thus, the bridge component 408 allows anonymous communication between various components, code, agent components/computers, and schedulers regardless of whether these are in the same machine/program space or not (e.g., communication can be implemented as if the components, code, agent components/computers, and schedulers are in the same machine/program space).

For example, a schedule can include an operation to be performed on a controller device, wherein the operation utilizes a back-up of data task and a virus scan task. A scheduler component can manage the operation and automatically perform the operation on the designated controller device by sharing the load of such operations (e.g., back-up of data and virus scan) over various agent components and/or agent computers that include at least one agent (e.g., instance of code, a portion of code, a unit of functionality, and the like), wherein the scheduler component can communicate to the two agents via the bridge component. However, in order to efficiently and quickly perform the operation, an agent hosted by a particular agent computer) can be implemented for the back-up of data and a disparate agent (hosted by either the same particular agent computer or a disparate agent computer) can be implemented for the virus scan. It is to be appreciated that the agent and the disparate agent can reside on at least one of the following: the same machine as the scheduler component 102; the agent component 404; and a disparate agent component (not shown). Moreover, the scheduler component 102 can communicate to at least one of the agent and the disparate agent via the bridge component 408 in order to automatically perform the operation(s) on the controller device in a quick and efficient manner regardless of where the agent and the disparate agent are hosted (e.g., if the agent is on the same machine as the scheduler component or if the agent is on a disparate machine as the scheduler, the bridge component is utilized for any communication—incoming and outgoing—associated with the scheduler component 102).

Figure 5:
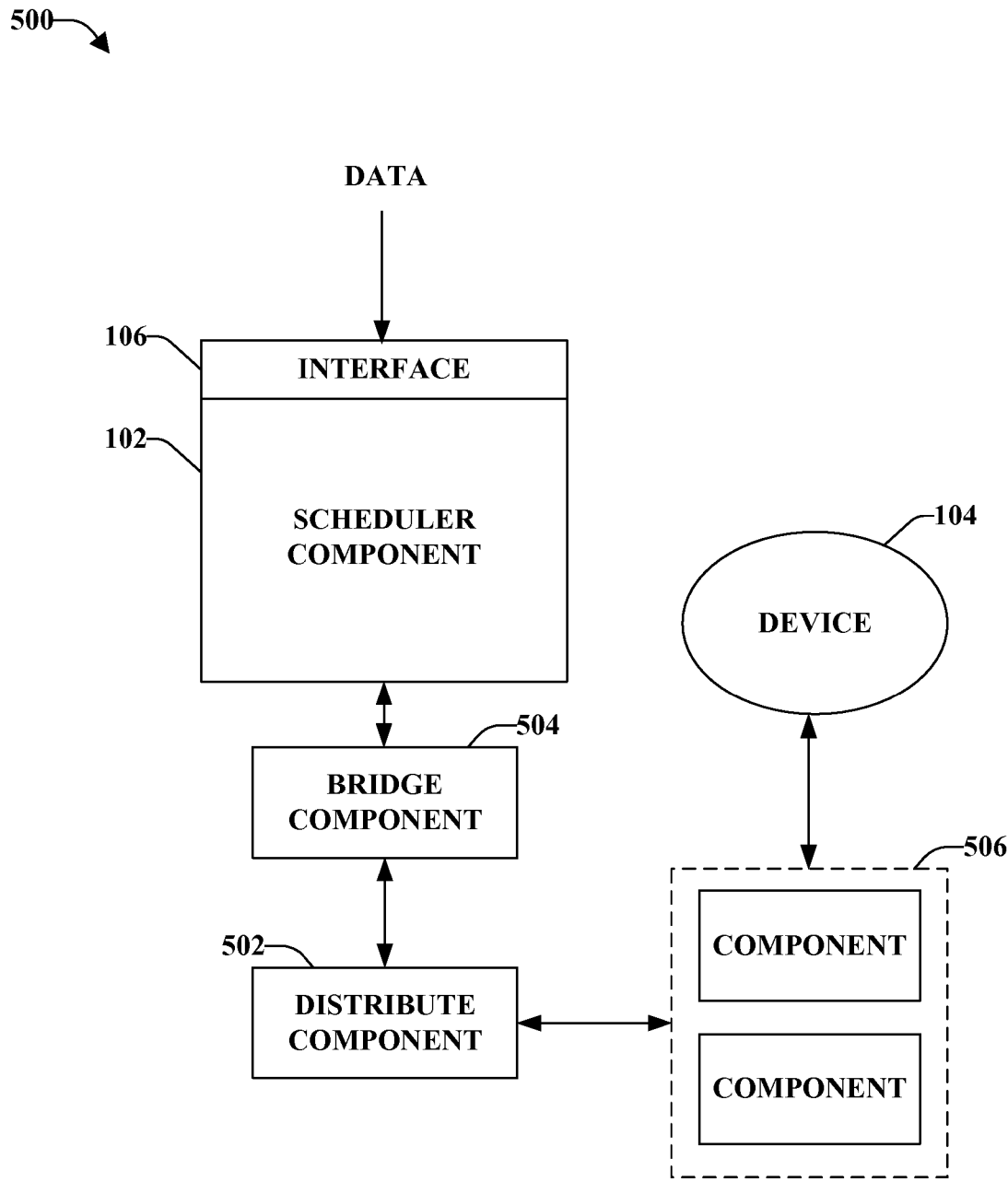
FIG. 5 illustrates a block diagram of an exemplary system that facilitates distributing a plurality of operations among one or more particular components to employ such operations on at least one device.

FIG. 5 illustrates a system 500 that facilitates distributing an operation among one or more particular components to employ an operation on a device. The system 500 can include the scheduler component 102 that automatically executes at least one operation on the device 104 based at least in part upon the data received via the interface 106, wherein the data can be, but is not limited to being, a list (also referred to as a schedule), a schedule, an operation, a time to perform an operation, a list of devices and respective operations to perform, security and/or authorization data related to the operations to execute, a particular component to execute the operation, a particular device to perform an operation, etc. Moreover, the operation can be, for example, a back-up of data, a re-boot, a shut-down, a virus-scan, a data-scan, a verification of data, a data upload, a system-check, a test, an update, a clean-up, a maintenance (e.g., physical and/or software-based), etc.

The system 500 can further include a distribute component 502 that facilitates dividing at least one operation to one or more agent components. For instance, the scheduler component 102 can utilize disparate components 506 (e.g., also referred to as agent components and/or agent computers that host at least one agent) to perform the tasks/operations by invoking code (e.g., an agent) therewith. It is to be appreciated that a bridge component 504 can be employed to provide any suitable communication related to the scheduler component 102 and that the bridge component 504 can be substantially similar to previously described bridge components. By employing disparate components 506, the operation(s) can be performed quickly as possible as well as utilizing available components and/or machines. Thus, the distribute component 502 can divide the workload associated with operations to be automatically performed by a given scheduler component 102. Moreover, the system 500 can provide for a mechanism to identify a particular agent component/computer to utilize to perform such operations.

For example, the scheduler component 102 can receive a schedule, wherein the schedule can include more than one operation that is to be performed. In order to be efficient and quick, the scheduler component 102 can communicate such operations to various agents (hosted by components, machines, agent components, agent computers, and the like) utilizing the bridge component 504 such that there is a one-to-one ratio between operations and agents. Thus, by dividing the operations to a plurality of agents in parallel rather than an agent performing each operation one at a time, the system 500 is extremely efficient and quick. Thus, upon distribution of the operations by the distribute component 502 (communicating to the scheduler component 102 via the bridge component 504), such operations can be performed on the devices 104.

Figure 6:
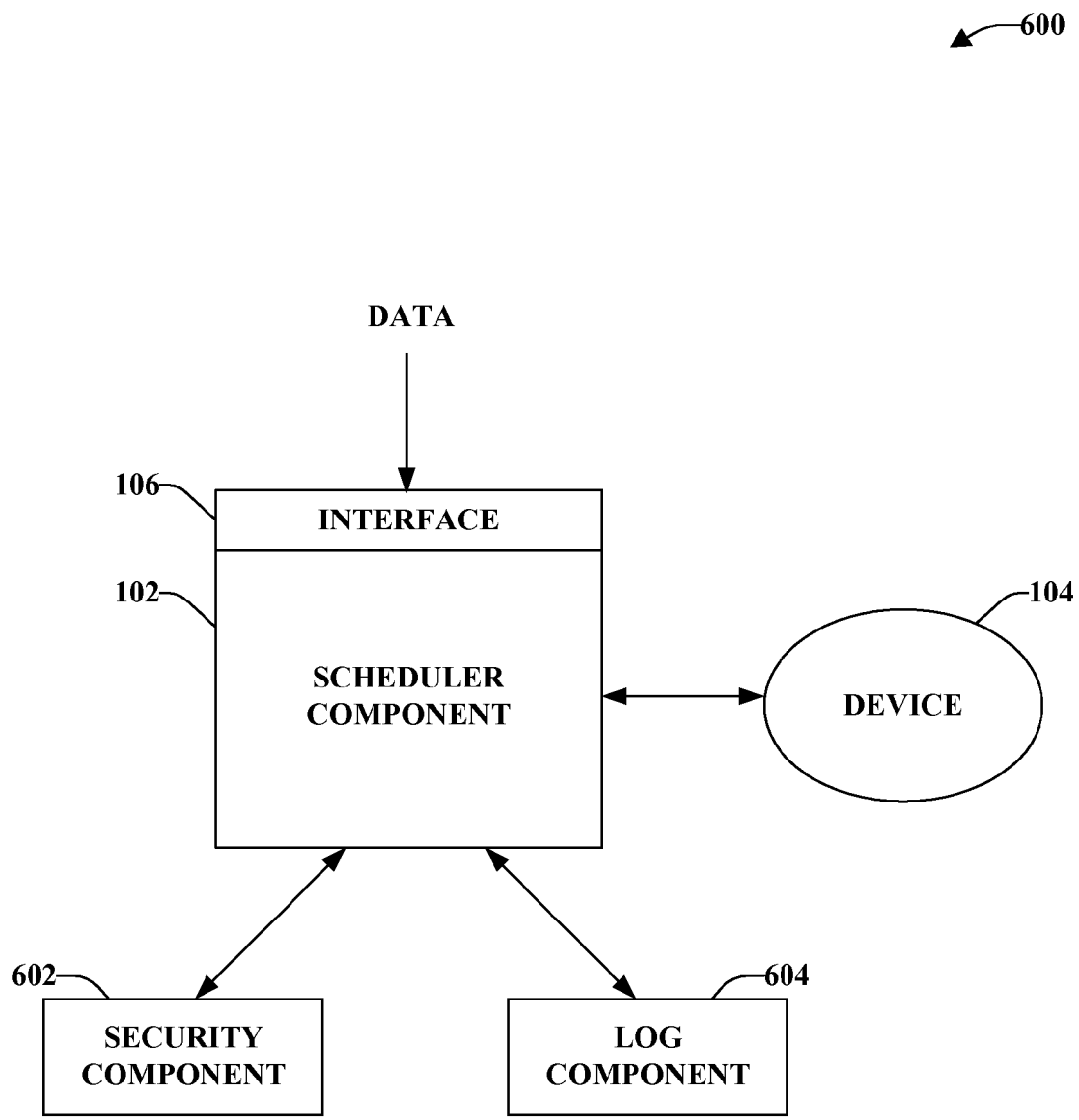
FIG. 6 illustrates a block diagram of an exemplary system that facilitates automatically performing an operation on a device within an industrial automation environment.

FIG. 6 illustrates a system 600 that facilitates automatically performing an operation on a device within an industrial automation environment. The system 600 can include a security component 602 that can ascertain which devices and/or operations related thereto a user is authorized to manipulate and/or execute. In accordance with one example, a user may only be authorized to perform a certain operation on the device 104, while not authorized to initiate a disparate operation on the device 104. In addition, the user may be able to manipulate a certain schedule associated with the device 104, while not authorized to manipulate a disparate schedule associated with a disparate device. The security component 602 can determine identity of a user by analyzing, for instance, usernames, passwords, personal identification numbers, personal status, management positions, occupation hierarchy, and the like. Furthermore, the security component 602 can determine a user's identity by analyzing biometric indicia, such as voice recognition, fingerprint analysis, retina analysis, etc.

Still further, the security component 602 can perform granular security with respect to a user and/or a device. Pursuant to one example, a user's rights with respect to a particular device can change as time alters. For instance, certain operations associated with a device performed by a user can be allowable by the user during a first shift but not allowable to the user during a second shift. Additionally, the security component 602 can provide different measures of security given different states of an operation and/or device. Therefore, for example, a user may have rights with respect to performing an operation in a first state but may have different rights with respect to the same operation in a second state.

The system 600 can further include a log component 604 that can work in conjunction with the scheduler component 102, the security component 602, and/or any combination thereof in order to track any data related to the system 600. For instance, the log component 604 can track and/or record data related to the operations performed, the devices to which operations where performed, times associated with initiated operations, updates and/or alterations to schedules, updates and/or alterations to devices, etc. Moreover, the log component 604 can track various user data in connection with any security and/or authorization utilized with the system 600. In such a case, the log component 604 can track which particular user updated a particular schedule.

Figure 7:
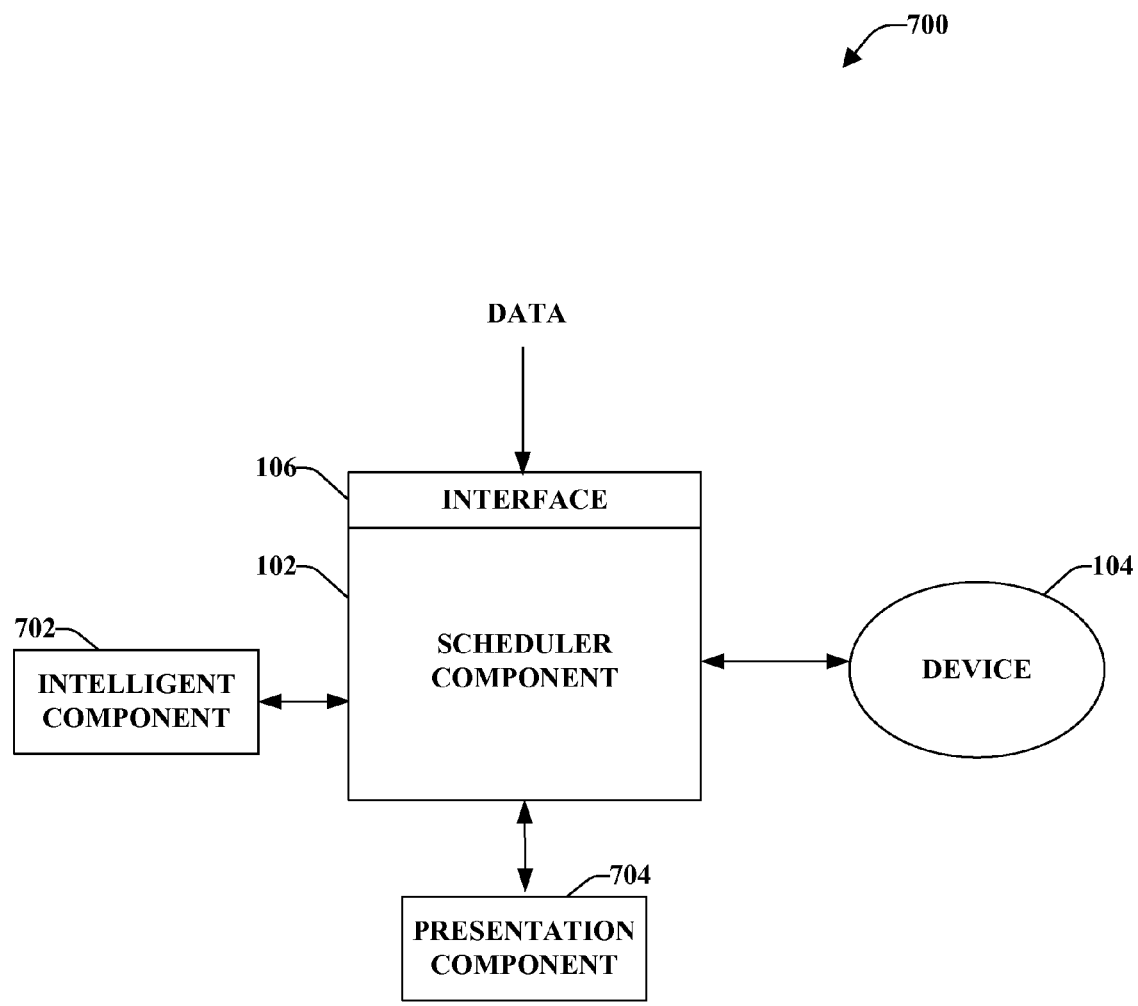
FIG. 7 illustrates a block diagram of an exemplary system that facilitates scheduling one or more operations to be executed on one or more devices associated with an industrial automation environment.

FIG. 7 illustrates a system 700 that employs intelligence to facilitate scheduling one or more operations to be executed on one or more devices associated with an industrial automation environment. The system 700 can include the scheduler component 102, the device 104, and the interface 106 that can all be substantially similar to respective components, devices, and interfaces described in previous figures. The system 700 further includes an intelligent component 702. The intelligent component 702 can be utilized by the scheduler component 102 to facilitate automatically performing an operation based on a list for the device 104 within an industrial automation environment. For example, the intelligent component 702 can infer lists for a device, operations to perform, instances on when to perform an operation, a change in a device, a change in a list, a change in an operation, devices added, devices removed, device location, security settings, updates, detection of changes with a device(s), hierarchical representation of devices within the industrial environment, user settings, profiles, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The presentation component 704 can provide various types of user interfaces to facilitate interaction between a user and any component coupled to the scheduler component 102. As depicted, the presentation component 704 is a separate entity that can be utilized with scheduler component 102. However, it is to be appreciated that the presentation component 704 and/or similar view components can be incorporated into the scheduler component 102 and/or a stand-alone unit. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the scheduler component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
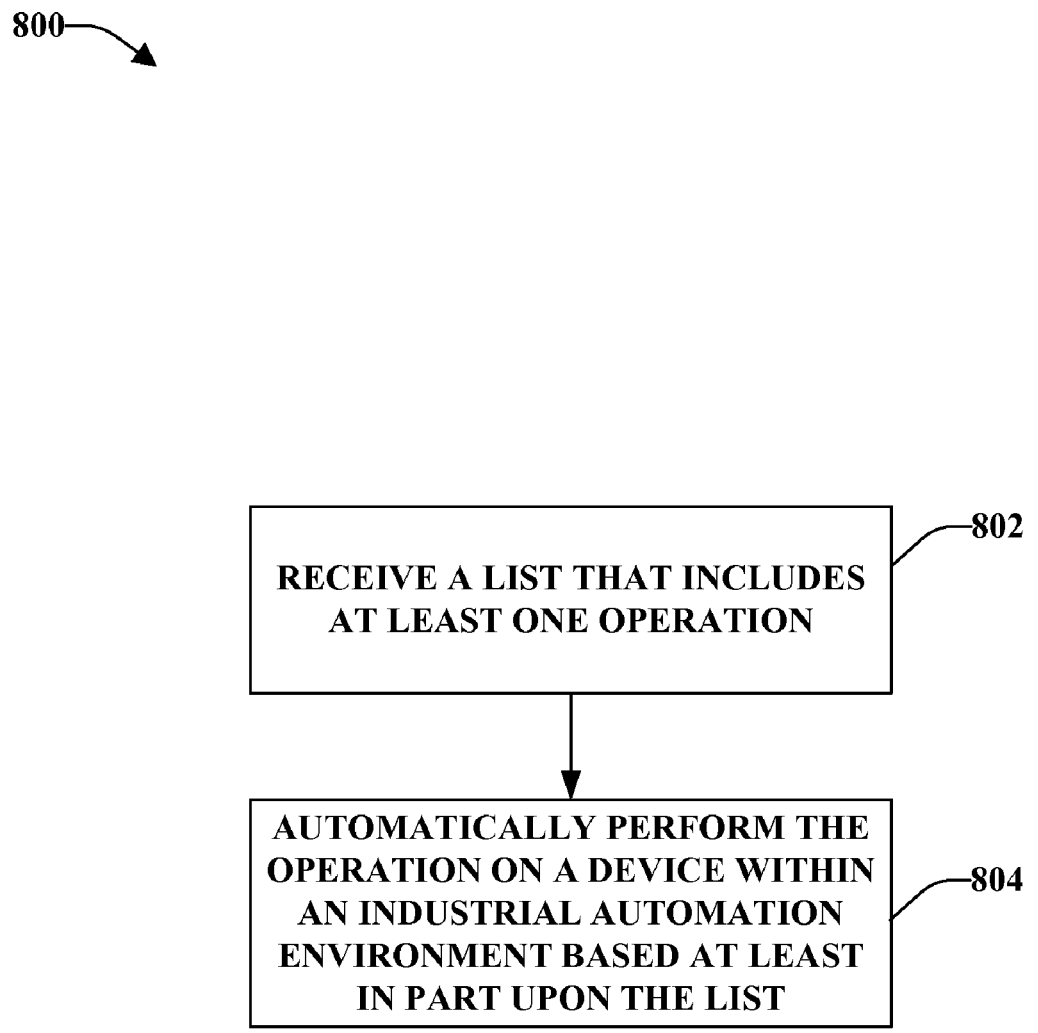
FIG. 8 illustrates an exemplary methodology for automatically performing an operation on a device within an industrial automation environment.
Figure 9:
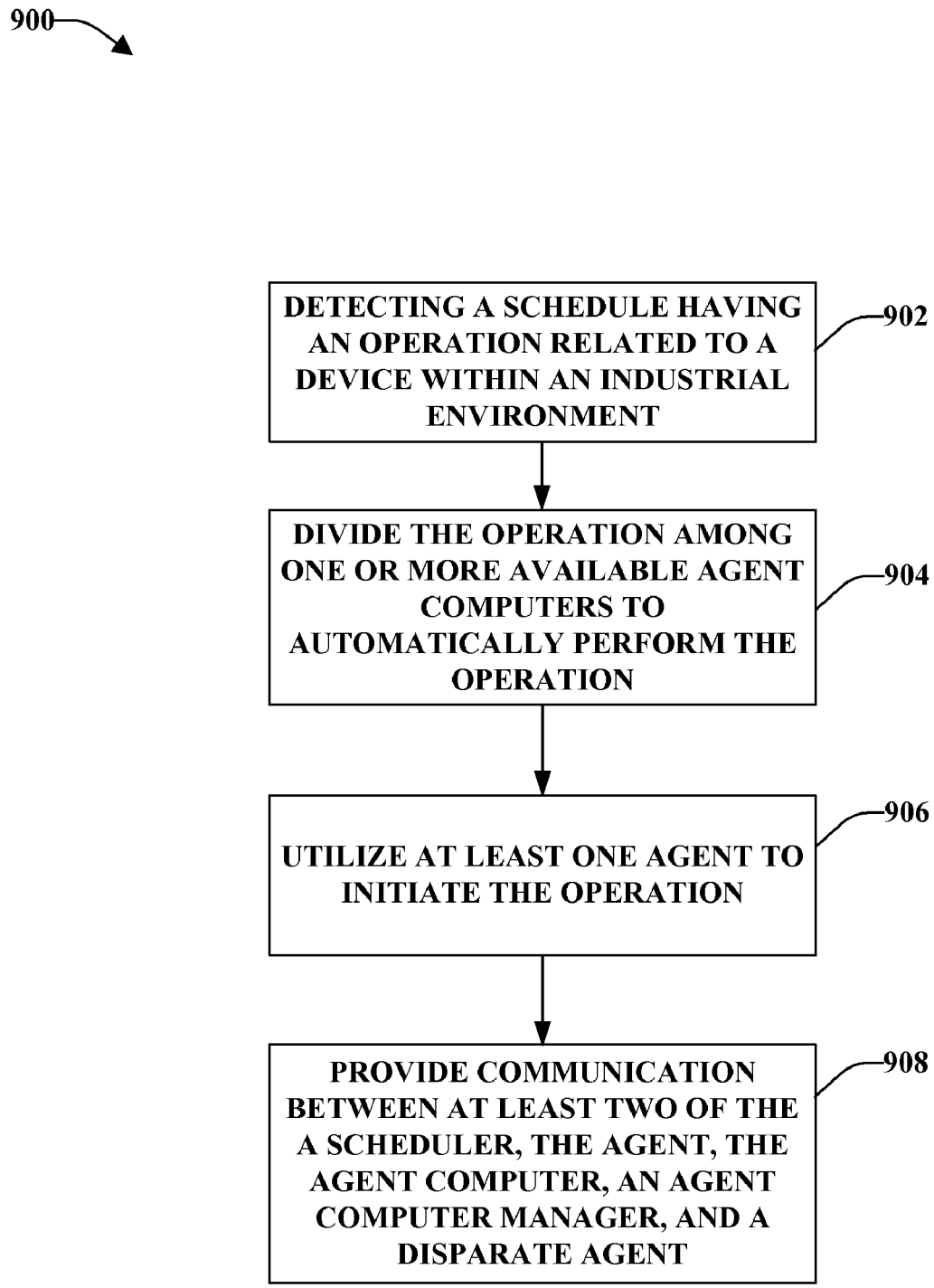
FIG. 9 illustrates an exemplary methodology that facilitates automatic detection and executing an operation associated with at least one device within an industrial environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for automatically performing an operation on a device within an industrial automation environment. At reference numeral 802, a list (also referred to as a schedule) can be received, wherein the list/schedule can include at least one operation. The operation can relate to a device within an industrial automation environment. For instance, the operation can be, but is not limited to being, a back-up of data, a re-boot, a shut-down, a virus-scan, a data-scan, a verification of data, a data upload, a system-check, a test, an update, a clean-up, a maintenance (e.g., physical and/or software-based), etc. Furthermore, the device can be any suitable device associated with an industrial automation environment such as, but not limited to, a physical device, a software device, an application, a virtual device, a programmable logic controller (PLC), a controller device, a pump, a press, a valve, a drain, a heater, a cooler, a switch, a sensor, a conveyor, and/or a portion thereof, as well as software, firmware, etc.

At reference numeral 804, the operation can be automatically performed on the device within the industrial automation environment based at least in part upon the list. For instance, the list/schedule can include at least one operation that is to be executed and/or initiated on the device. The list can further include data related to the operation such as, but not limited to, minimum requirements for a component and/or computer to implement such operation, a specific machine and/or component to perform the operation, a time for the operation to be executed, a time interval for the operation, a security authorization on access to devices and/or operations, etc. Moreover, the operation can be divided amongst various agents (e.g., unit of functionality, code, etc.) to employ such operations, wherein such division can be a one-to-one ratio (e.g., one agent for each operation) to allow increased efficiency and productivity.

It is to be appreciated that the industrial environment can include various devices wherein at least two devices can be hierarchically arranged, such as one that is utilized to manufacture consumables, textiles, automobiles, or any other suitable industrial environment. Thus, the hierarchical representation of devices may be a combination of physical devices and software. In addition, the hierarchy can be based at least in part upon a characteristic such as, but not limited to, the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

FIG. 9 illustrates a methodology 900 that facilitates automatically detecting and executing an operation associated with at least one device within an industrial environment. At reference numeral 902, a schedule having an operation related to a device can be received and/or detected within an industrial environment. For instance, a device within the industrial environment can have a particular schedule associated therewith, wherein such schedule can be specific to the device and identify specific operations to be performed thereupon. In another example, the industrial environment can be dynamically polled to continuously provide schedules associated with devices and/or any updates, alterations, removals, and the like. In still another example, the schedules can be manually provided and stored on a particular repository for implementation. It is to be appreciated that the operation can be, but is not limited to being, a back-up of data, a re-boot, a shut-down, a virus-scan, a data-scan, a verification of data, a data upload, a system-check, a test, an update, a clean-up, a maintenance (e.g., physical and/or software-based), etc. Furthermore, the device can be any suitable device associated with an industrial automation environment such as, but not limited to, a physical device, a software device, an application, a virtual device, a programmable logic controller (PLC), a controller device, a pump, a press, a valve, a drain, a heater, a cooler, a switch, a sensor, a conveyor, and/or a portion thereof, as well as software, firmware, etc.

At reference numeral 904, the operations can be divided among one or more available agents hosted by agent computers and/or agent components to automatically perform the operation. Thus, other computers can be utilized to perform the operation by invoking code (e.g., an agent). The operations can be performed as quickly as possible by distributing the operation/task load among any available machines and/or computers having at least one agent associated therewith. At reference numeral 906, at least one agent can be utilized to initiate the operation. In other words, the operation can be implemented by an agent, wherein the agent can perform at least a portion of the operation and/or the entire operation through completion. At reference numeral 908, communication between at least two of the agent, the agent computer, a scheduler, an agent computer manager (e.g., an agent component manager) and a disparate agent can be provided utilizing a bridge technique. Such bridge technique allows communication in a manner such that the scheduler need not comprehend the location of an agent, an agent computer, and an agent component. In other words, the bridge technique allows anonymous communication between various components, code, agent components/computers, and schedulers regardless of whether these are in the same machine/program space or not (e.g., communication can be implemented as if the components, code, agent components/computers, and schedulers are in the same machine/program space). By providing such communication, the agents that reside on other machines and/or computers can communicate to the scheduler and/or each other as if that agent were on the same machine and/or computer.

Figure 10:
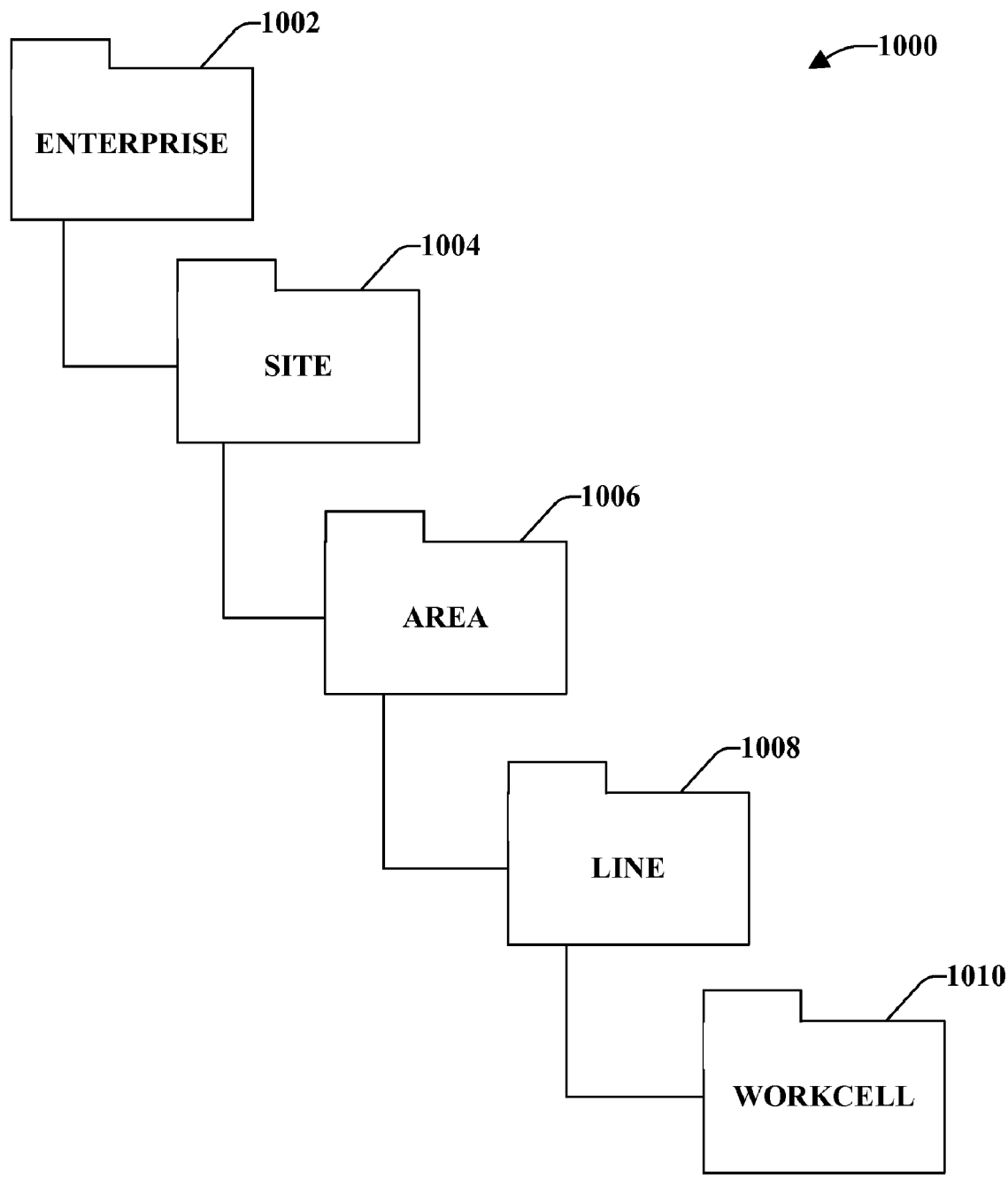
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of assets) alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith.

Figure 11:
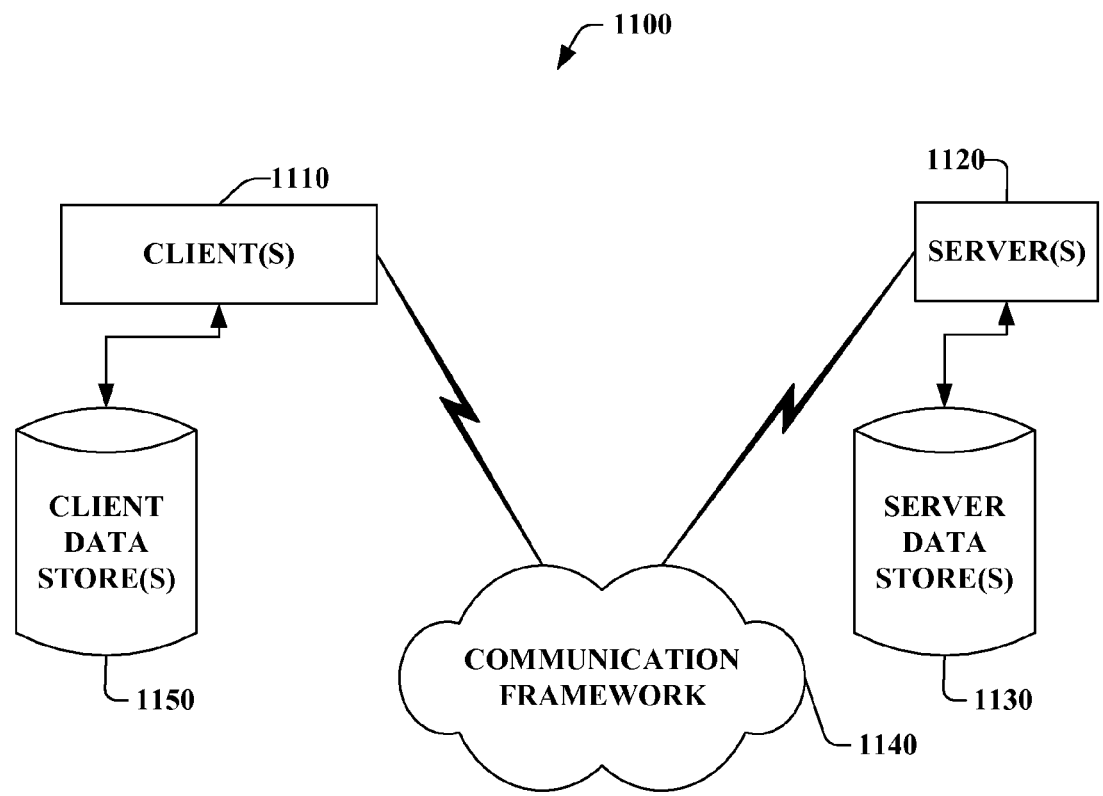
FIG. 11 is an exemplary computing environment that can be utilized in connection with the claimed subject matter.
Figure 12:
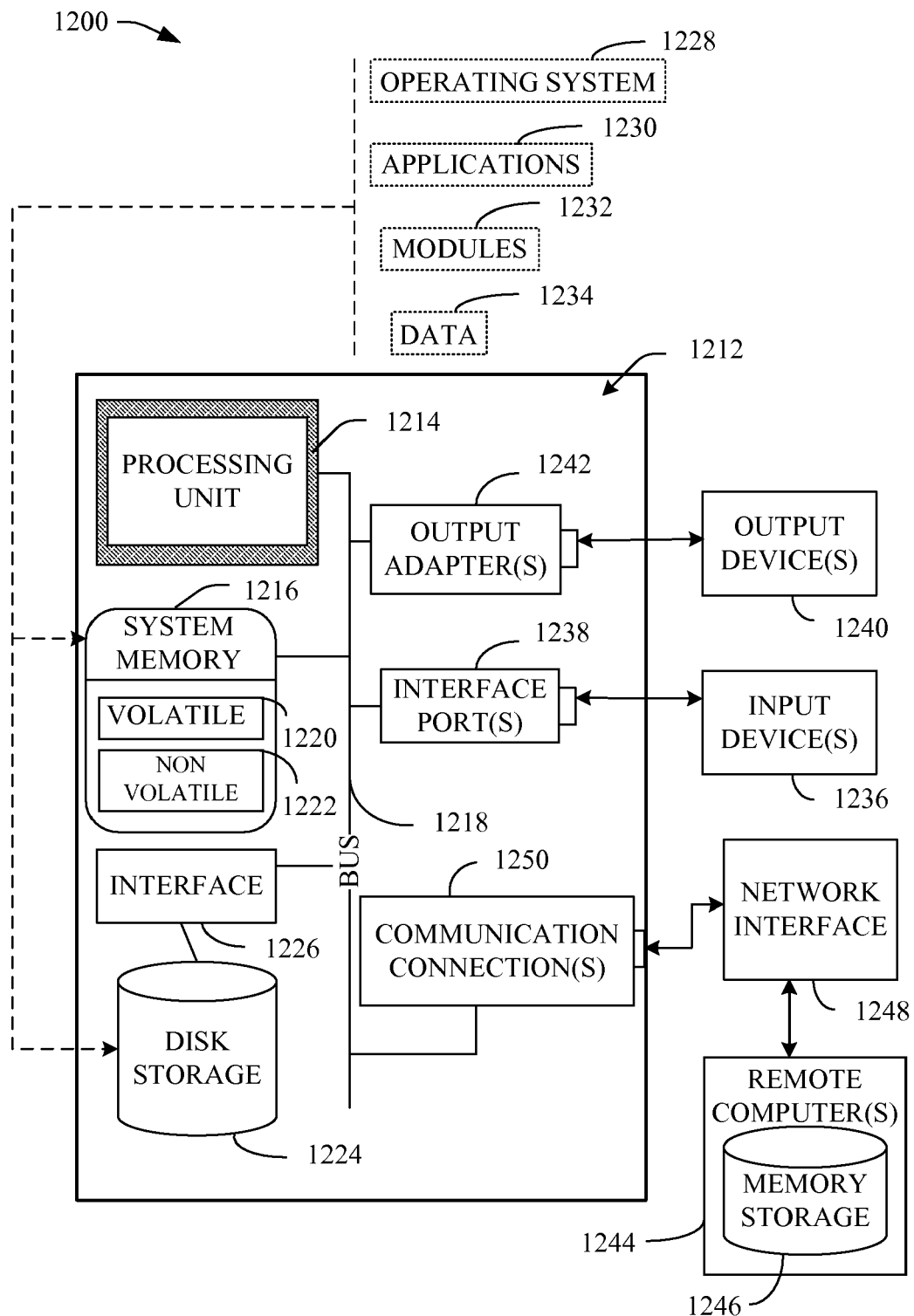
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on a computer readable storage medium that facilitates automatically scheduling an operation in an industrial environment, comprising:
    an interface component configured to receive a schedule defining at least one operation to be performed on a device within the industrial environment;
    a distribute component configured to divide the at least one operation among one or more disparate agent components;
    a scheduler component configured to instruct at least one agent hosted by the one or more disparate agent components to perform the at least one operation on the device at a time indicated by the schedule;
    a bridge component configured to facilitate communication between the scheduler component and the at least one agent, and between the at least one agent and a disparate agent to facilitate distributing performance of the at least one operation between the at least one agent and the disparate agent; and
    a detection component configured to ascertain at least one of when a device has been added to the industrial environment, when a device has been removed from the industrial environment, when a device has been updated within the industrial environment, a schedule, or an alteration to a schedule respective to a device, wherein the detection component is configured to poll the industrial environment for a new device that includes a new schedule defining at least one operation to be performed on the new device, and to store the new schedule for retrieval and implementation by the scheduler component.

2. The system of claim 1, further comprising a data repository that retains a hierarchical representation of devices comprising the industrial environment, the hierarchical representation based at least in part upon physical locations of the devices comprising the industrial environment.

3. The system of claim 2, wherein the hierarchical representation of devices is based at least in part upon an industry standard that is at least one of Industrial Standard Architecture (ISA) S95 or S88.

4. The system of claim 2, wherein the at least one agent includes associated information indicating at least one of disparate agents that are allowed to co-exist with the at least one agent or a number of instances of the at least one agent that are allowed to run concurrently.

5. The system of claim 2, wherein the hierarchical representation includes at least a level representing a plant, a level representing at least one programmable logic controller, and a level representing at least one device controlled by the programmable logic controller.

6. The system of claim 2, wherein the device is at least one of a physical device, software, or firmware.

7. The system of claim 6, wherein the device is at least one of a software device, an application, a virtual device, a programmable logic controller (PLC), a controller device, a pump, a press, a valve, a drain, a heater, a cooler, a switch, a sensor, or a conveyor.

8. The system of claim 1, wherein the operation is at least one of a back-up of data, a re-boot, a shut-down, a virus-scan, a data-scan, a verification of data, a data upload, a system-check, a test, an update, a clean-up, a physical maintenance, or a software-based maintenance.

9. The system of claim 1, the schedule includes at least one of the operation, a time to perform the operation, a list of devices and respective operations to perform thereupon, a security data related to the operation, a particular component to execute the operation, or a particular device to perform the operation.

10. The system of claim 1, wherein the agent performs at least a portion of the operation.

11. The system of claim 1, wherein the at least one agent is one of a unit of functionality, a portion of code, software, an application, a software code, or a process.

12. The system of claim 1, wherein the at least one agent defines a minimum requirement for the scheduler component to restrict execution of the operation to an agent component that satisfies such minimum requirement.

13. The system of claim 12, further comprising an agent component manager that ascertains available agent components and identifies an agent component having an agent capable of executing the operation thereupon, wherein communication between the agent component manager and the available agent components is provided via the bridge component.

14. The system of claim 1, wherein the bridge component provides communication between at least two of the following: the scheduler component, the one or more agent components, the agent, an agent component manager, or an agent initiating at least a portion of the operation.

15. The system of claim 1, further comprising a security component that ascertains authorization related to at least one of access to a device, access to a schedule, or implementation of an operation.

16. The system of claim 1, further comprising a log component that tracks data related to at least one of the scheduler component, the agent, or the agent component.

17. The system of claim 16, the log component tracks at least one of the operation performed, the device on which the operation is performed, a time associated with the operation, an update to a schedule, an update to the device, an alteration to a schedule, or an alternation to a device.

18. A method that facilitates automatically scheduling an operation in an industrial environment, comprising:
- receiving a schedule that includes at least one operation to be performed on a device within the industrial environment;
- dividing the at least one operation among two or more available agents respectively hosted by at least two agent components;
- automatically performing the at least one operation on the device within the industrial environment using the two or more available agents;
- establishing communication between the two or more available agents to coordinate performing the at least one operation;
- polling the industrial environment for presence of new schedules associated with a device;
- detecting a new schedule within a new device added to the industrial environment, the new schedule specifying at least one operation to be performed on the new device; and
- instructing at least one of the available agents to perform the at least one operation on the new device.

19. The method of claim 18, further comprising representing the device hierarchically based at least in part upon a physical location of the device within the industrial environment.

20. The method of claim 19, wherein representing the device comprises representing the device hierarchically based at least in part upon at least one of an Industrial Standard Architecture (ISA) S95 standard or ISA S88 standard.

21. The method of claim 18, further comprising associating operational information with at least one of the available agents that identifies one or more disparate agents that are allowed to co-exist with the at least one of the available agents.

22. The method of claim 18, further comprising associating operational information with at least one of the available agents specifying a number of instances of the at least one of the available agents allowed to run concurrently.

23. The method of claim 18, the operation is at least one of a back-up of data, a re-boot, a shut-down, a virus-scan, a data-scan, a verification of data, a data upload, a system-check, a test, an update, a clean-up, a physical maintenance, or a software-based maintenance.

24. The method of claim 18, further comprising:
- dividing the at least one operation among one or more available agents hosted by at least one agent component to automatically perform the at least one operation; and
- utilizing one or more agents to initiate the operation.

25. The method of claim 18, further comprising providing communication between at least two of the following: the agent component, the agent, an agent component manager that ascertains available computers that host agents, or an agent initiating at least a portion of the operation.

26. A computer-implemented system that facilitates performing an operation on a device in an industrial environment, comprising:
- a processor;
- a memory communicatively coupled to the processor, the memory having stored therein computer executable instructions configured to implement the system, including:
- means for receiving a schedule specifying at least one operation to be performed on a device within the industrial environment;
- means for dividing the at least one operation among two or more agent components;
- means for automatically performing the at least one operation on the device at a time indicated by the schedule, wherein the means for automatically performing the at least one operation utilizes at least two agents hosted respectively by the two or more agent components;
- means for managing the agent components associated with the system;
- means for facilitating communication between the means for automatically performing the at least one operation and the one or more disparate agent components;
- means for communicating between the at least two agents to coordinate performing the at least one operation;
- means for polling the industrial environment for presence of new schedules;
- means for detecting a new schedule within a new device added to the industrial environment, the new schedule specifying at least one new operation to be performed on the new device; and
- means for instructing at least one of the available agents to perform the at least one new operation on the new device.

* * * * *